United States Patent [19]

Costa et al.

[11] 3,811,013

[45] May 14, 1974

[54] PCM TELECOMMUNICATION SYSTEM HAVING MEANS FOR TEMPORARY EXCLUSION OF VOICE CHANNELS UNDER OVERLOAD CONDITIONS

[75] Inventors: Gianmario Costa, Cornaredo; Giancarlo Monti, Milan; Isidoro Poretti, Castigilione; Alvaro Bagnoli, Milan, all of Italy

[73] Assignee: Societa Italiana Telecommunicazioni Siemens S.p.A., Milan, Italy

[22] Filed: Dec. 18, 1972

[21] Appl. No.: 315,897

[30] Foreign Application Priority Data

Dec. 17, 1971 Italy .............................. 32585/71

[52] U.S. Cl. ....... 179/15 BA, 179/15 BV, 179/15 A

[51] Int. Cl. ........................................ H04j 3/04

[58] Field of Search ...... 179/15 BV, 15 BA, 15 AT, 179/15 A, 15 AP, 15 BS, 15 BY

[56] References Cited

UNITED STATES PATENTS 3,752,933 8/1973 Cohen .......................... 179/15 BV

*Primary Examiner*—Ralph D. Blakeslee

*Attorney, Agent, or Firm*—Karl F. Ross; Herbert Dubno

[57] ABSTRACT

A terminal of a pulse-code-modulation (PCM) time-division multiple-access (TDMA) telecommunication system, serving for the exchange of digitized message samples in the form of interleaved multibit pulse codes between a multiplicity of local voice channels and a like number of remote voice channels accessible through another terminal, includes at least one processing station serving several *n*-channel groups whose incoming lines are periodically sampled by respective group coders working into a common multiplexer. A processor inserted between each group coder and the multiplexer comprises a pair of alternately operative shift registers which receive only the coded voice samples from active lines, as determined by a monitoring circuit including a multiplicity of voice detectors, and subsequently discharge them at an accelerated rate in an intermittent code sequence for intercalation in a PCM frame with the similar code sequences from other processors of the station. The voice detectors deliver an activity pattern for all the *n* channels of the corresponding group to an allocation-message generator provided with an *n*-stage input register and an *n*-stage output register; characteristic bits representing active stages are transferred, stage by stage, from the input register to the output register under the control of a cyclic scanner including a ring counter which is continuously stepped by clock pulses unless its advance is blocked by a linear pulse counter, registering the number of characteristic-bit transfers per frame, if that number reaches the maximum number of communication time slots allotted to the group in an assigned subframe of the multiplexer. On the next frame, scanning is restarted from the position in which the ring counter was last stopped, except during certain frames in which the ring counter is reset to zero for synchronization with a similar ring counter in an associated receiving station at the remote terminal where the allocation message, partly transmitted during each frame, is decoded with the aid of another ring counter and linear counter operating in step with those of the transmitting station.

10 Claims, 8 Drawing Figures

PCM TELECOMMUNICATION SYSTEM HAVING MEANS FOR TEMPORARY EXCLUSION OF VOICE CHANNELS UNDER OVERLOAD CONDITIONS

Field of the Invention

Our present invention relates to a PCM (pulse-code modulation) telecommunication system of the time-division multipleaccess (TDMA) type in which messages consisting of voice-frequency signals are periodically sampled (e.g. as to amplitude) and translated into digital form, i.e. into multibit pulse codes, for transmission to a remote destination in interleaved relationship with similar multibit codes of other messages traveling over the same signal path.

Background of the Invention

In commonly owned U.S. Pat. application Ser. No. 244,578 filed Apr. 17, 1972 by one of us, Giancarlo Monti, there has been disclosed a system of this general type wherein digitized message samples in the form of multibit pulse codes are transmitted from a first station over a signal path to a remote second station for the exchange of information between a number of groups of local voice channels served by each station, each channel including an incoming and outgoing line. The incoming lines of each group terminate at a respective group cover having access to a multiplexer, this access being controlled by a gate in response to a binary activity pattern which is stored in a memory and periodically updated under the control of respective monitoring units which test the instantaneous conditions of the several incoming lines feeding each group coder, i.e., which ascertain the presence or absence of voice currents on such lines. The gate blocks the inscription of blank codes from inactive lines in a shift register individually assigned to each group, this register therefore containing only significant code words from active lines which are read out at high speed to the multiplexer together with allocation bits derived from the activity pattern to inform the remote terminal of the origins of the individual pulse codes in a code reference transmitted during a frame of, say, 125 $\mu$5. The frame comprises a predetermined number of communication time slots, allotted to the several channel groups, as well as additional time slots for a number of allocation bits constituting part of an allocation message which identifies the active channels and is transmitted in its entirety in a predetermined number of successive frames. At the remote terminal, the reserve procedure is followed with restoration of the individual code words to their original relative time position, in respective sampling intervals of a frame, for distribution to their respective destinations as determined by decoding equipment responsive to the allocation message.

The number of communication time slots allotted to the several channel groups should be sufficient to handle normal traffic. Under overload conditions, however, the number of active lines may exceed the number of available time slots whereupon a supervisory counter halts the sampling of the channels by the monitoring units which generate the activity pattern so that some of these channels are denied access to the associated group coders and are therefore excluded from communication. Since the activity pattern determines the contents of the allocation message which requires a series of frames for its transmission, the duration of such a frame series or superframe represents the minimum delay for resumption of voice transmission over a temporarily excluded channel. If, for the sake of verification, it is desired to repeat each allocation message several times to insure a correct response of the address decoder at the remote terminal, this exclusion period is correspondingly multiplied.

Objects of the Invention

It is, therefore, the general object of our invention to reduce the exclusion period of any channel under the described overload conditions in a system of the type disclosed in the commonly owned application identified above.

A more particular object of our invention is to provide means in such a system for distributing the exclusion over all the participating channels so that communication over a single channel is interrupted only for a very short period, preferably for not more than the duration of one frame.

Summary of the Invention

These objects are realized, in accordance with our present invention, by the provision of an allocation-message generator which includes an n-stage input memory and an n-stage output memory, n being the number of sampling intervals per frame (e.g. 30, as in the example given in the prior Monti application) assigned to each group coder for the sampling of the incoming lines of the associated channel group. The input memory is loaded with bits representing the binary activity pattern supplied by the associated monitoring units, this information being periodically updated. The contents of the input memory are transmitted, stage by stage, to the output memory under the control of a cyclic scanner including a ring counter which is rapidly stepped by a train of clock pulses emitted by a timer; the transmission of a characteristic bit indicative of an active line (usually a true bit) from the input memory to the output memory generates an output pulse to step a linear pulse counter which causes the blocking of the ring counter whenever the count of output pulses reaches a predetermined limit corresponding to the number of available time slots. With the ring counter reset only after a multiplicity of frames, i.e. after one or more frame series or superframes sufficient for the transmission of the entire $n$-bit allocation message at a rate of $g$ bits per frame ($g$ being an aliquot fraction of $n$), the transmission of activity information from the input memory to the output memory between resettings is resumed in the next-following frame at a randomly selected memory stage, preferably the stage at which the scan was previously halted, so that the bits relating to heretofore excluded active channels now participate in the generation of the allocation message. The input memory may be designed as an orthogonal array with $m$ rows of $g$ stages each, the $g$ allocation bits transmitted in any one frame to the remote station being derived from a single row of such stages. By shifting from one row to the next only once in every succession of $p$ frames where $p$ is an integer greater than one (e.g. three), we insure the repetitive transmission of each allocation bit in a superframe.

The allocation message, stored in an operating memory which is periodically updated from the contents of the output memory, controls the elimination of blank codes from the incoming PCM signals in a processor which consolidates the remaining code words, representing the digitized voice samples of active channels, into an intermittent code sequence consisting of code groupings into which the $g$-bit fraction of the allocation message is also inserted. These code groupings are fed to the multiplexer for intercalation with similar code sequences from other group coders, in respective subframes of a frame, for transmission over the signal path to the remote station. There, a retrieval network extracts the allocation bits from the output of a demultiplexer so as to reconstitute the original allocation message in the course of a superframe, this network being provided with storage means similar to those of the allocation-message generator including an input memory, an output memory and an operating memory. A cyclic scanner synchronized with that of the transmitting station, also including a ring counter, controls the transfer of characteristic bits from the input memory to the output memory in producing a replica of the original activity pattern, thereby again giving rise to output pulses fed to a linear counter which operates in step with the transmission-side counter to halt and restart the scan in an operation paralleling that of the allocation-message generator. The periodic resetting of the ring counters (once every one or more superframes) and of the linear counters (once per frame) at both ends of the signal path, synchronized under the control of timer signals which mark the beginning of each subframe, frame and superframe, ensures that the allocation bits controlling the elimination of blank codes at the transmitting station correspond always to those controlling a complementary processor at the receiving station which determine the time position of the arriving code words in the reconstituted continuous code sequence fed to an associated group decoder.

The blocking of each ring counter may be accomplished with the aid of a respective comparator which receives the output of the associated linear counter and emits an inhibiting signal upon detecting a match between this count and a preselected numerical value fed in by a source of reference bits.

Brief Description of the Drawing

The above and other features of our invention will now be described in detail with reference to the accompanying drawing in which:

FIG. 2 is a circuit diagram of the receiving side of the same station (or of a remote station communicating therewith)

Specific Description

Figure 1:
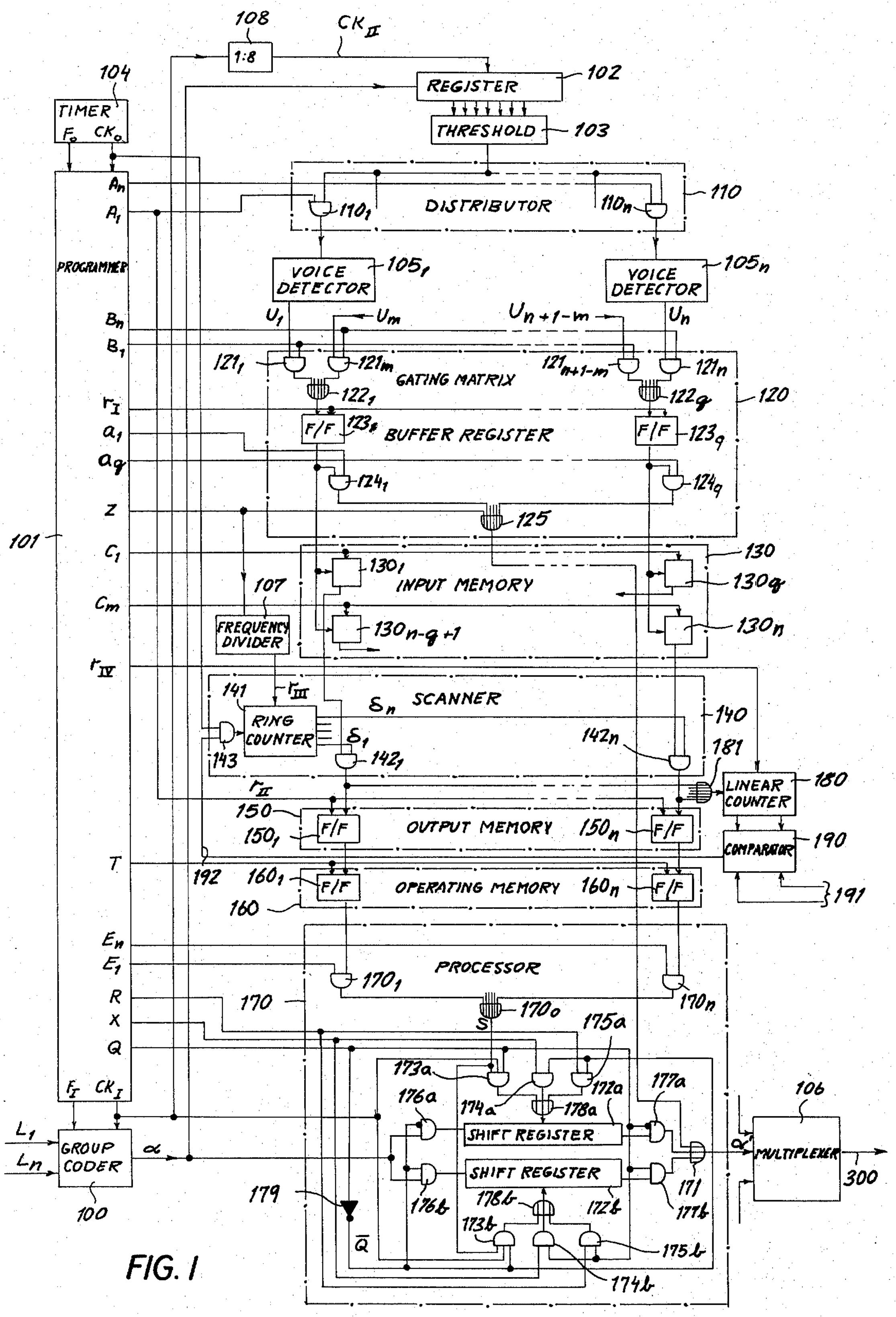
FIG. 1 is a circuit diagram of the transmission side of a station forming part of a PCM telecommunication system according to the invention.
Figure 2:
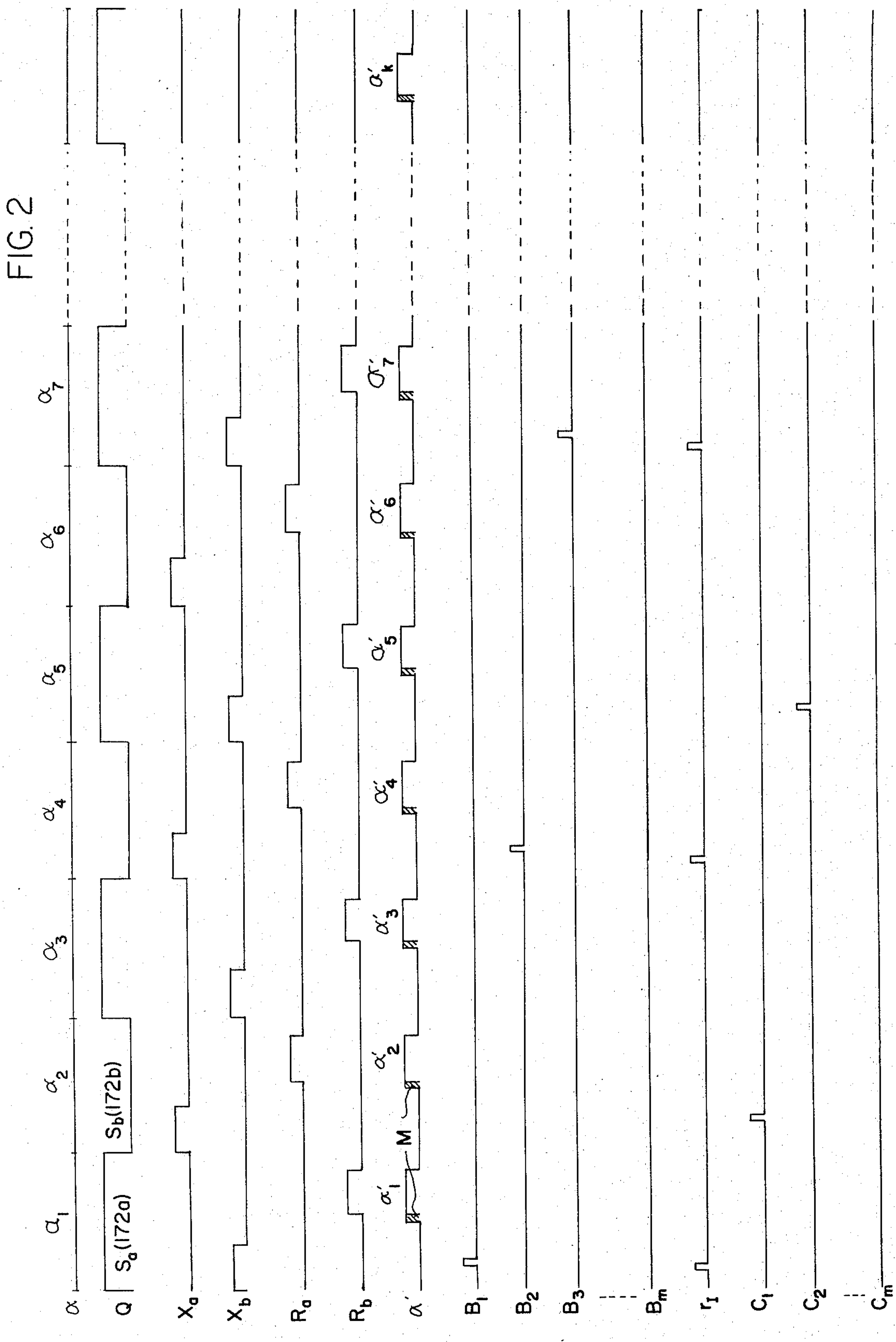
FIGS. 2, 3 and 4 are sets of graphs relating to the operation of the transmission circuits of FIG. 1.

In FIG. 1 a group coder 100, controlled by a programmer 101, synthesizes a code sequenced from speech signals arriving over a number of incoming lines $L_1$– $L_n$ (see also FIG. 2). This continuous code sequence is transmitted, on the one hand, to a processor 170 for conversion into an intermittent code sequence $\alpha'$, with exclusion of the blank codes from idle lines, and on the other hand to a register 102 in the input of a digital threshold circuit 103. Register 102 has eight stages to accommodate the eight bits of a pulse code received from an active line during a sampling interval of 125/n $\mu$s, the register being periodically discharged into threshold circuits 103 in response to a series of test pulses $CK_{II}$ which are derived from a train of low-rate clock pulses $CK_I$ in the output of programmer 101 through an 1:8 frequency divider 108. Threshold circuit 103 determines whether the digitized signal level of any incoming line $L_1$ – $L_n$ does or does not equal (or exceed) a predetermined minimum level and, if it does, generates an output which is fed in parallel to a plurality of AND gates $110_1$ – $110_n$ in a distributor 110. AND gates $110_1$ – $110_n$ are sequentially unblocked, during consecutive sampling intervals, by respective pulses $A_1$ – $A_n$ (see also FIG. 3) from programmer 101 which receives from a timer 104 a train of high-rate clock pulses $CK_o$ as well as a periodic frame-start pulse $F_o$ recurring every 125 $\mu$s.

AND gates $110_1$– $110_n$ (of which only the first and the last one have been illustrated) work into respective voice detectors $105_1$ – $105_n$ which are essentially integrators and monitor the activity of lines $1_1$ – $L_n$, respectively; if the decoded signal level in the output of threshold 103 (as integrated over a number of successive frames) surpasses a predetermined value, the voice detector has an output $U_1$ – $U_n$.

The number $n$ of channels per group (only one such group being considered in the present description) is the product of two integers $m$, $g$ enabling a division of the several voice detectors $105_1$ – $105_n$ into $g$ subgroups of $m$ detectors each. The outputs $U_1$ – $U_m$ of the first subgroup are fed into respective AND gates $121_1$ – $121_m$ of a gating matrix 120 working into a common OR gate $122_1$. Similarly, the outputs $U_{n+1-m}$ – $U_m$ of the last subgroup are fed into respective AND gates $121_{n+1-n}$ – $121_n$ of that matrix working into a common OR gate $122_q$. The intervening, analogous stages of this gating matrix have not been illustrated. Corresponding AND gates of each subgroup are unblocked in parallel by the programmer 101 with the aid of pulses $B_1$ – $B_m$ staggered at intervals of 475 $\mu$s, corresponding to $p = 3$ frames. Thus, pulse $B_1$ is delivered to the first AND gate $121_1$, . . . $121_{n+1-m}$ of each subgroup whereas pulse $B_m$ reaches the last AND gate $121_m$, . . . $121_n$ thereof.

Each OR gate $122_1$ – $122_q$, upon conducting, sets a respective flip-flop $123_1$ – $123_q$ forming a stage of a $q$-stage buffer register included in gating matrix 120. These flip-flops are jointly resettable by a pulse $r_I$ from programmer 101, recurring at the same cadence (i.e. one very three frames) as the gating pulses $B_1$ – $B_m$. The set outputs of flip-flops $123_1$ – $123_q$ are delivered to an input memory 130 of an allocation-message generator and, in parallel therewith, to a set of AND gates $124_1$ – $124_q$ also included in matrix 120. The latter AND gates, sequentially unblocked by respective pulses $a_1$ – $a_q$ from programmer 101, work into a common OR gate 125 which additionally receives a synchronizing pulse Z immediately following the pulse $a_q$. The output of OR gate 125 is delivered to an OR gate 171 in processor 170 for transmission to a multiplexer 106 as part of the intermittent code sequence $\alpha'$ which is sent to a remote station via a signal path 300.

Input memory 130 comprises an orthogonal array of $n$ binary stages divided into $m$ rows of stages $130_1$ – $130_q$, . . . $130_{n-q+1}$ – $130_n$. The first stage of each row is connected to the set output of flip-flop $123_1$ whereas the last stage is connected to the set output of flip-flop $123_q$; the intervening stages, analogously connected, have not been illustrated. The stages of each row are read out simultaneously by respective transfer pulses $C_1 - C_m$ from programmer 101 which trail the corresponding gating pulses $B_1 - B_m$ by approximately a frame length.

A cyclic scanner 140 comprises an *n*-stage ring counter 141 whose outputs $\delta_n - \delta_n$ sequentially unblock a set of AND gates $142_1 - 142_n$ respectively receiving the bits stored in stages $130_1 - 130_n$ of input register 130. Ring counter 141 is stepped by clock pulses $CK_o$ through an AND gate 143 and is periodically reset, after a whole number *y* of superframes, by a pulse $r_{III}$ derived from synchronizing pulse Z through a binary frequency divider 107. With $q = n \cdot m$ allocation bits transmitted in every 3-frame period, a superframe accommodating the entire twice repeated allocation message (indicating the state of activity of all *n* channels) consists of $3n/q = 3m$ frames; pulse $r_{III}$ thus recurs every $3m \cdot Y$ frames. AND gates $142_1 - 142_n$ feed the setting inputs of respective flip-flops $150_1 - 150_n$ of an *n*-stage output memory 150 and, in parallel therewith, a linear pulse counter 180 to whose stepping input they are connected through an OR gate 181. Counter 180 loads a comparator 190 which is preset to a predetermined value, via a set of input leads 191 from a nonillustrated digital signal source, representing the maximum number of time slots available in a subframe for communication bits (as distinct from allocation bits) included in code groupings $\alpha'_1$, $\alpha'_2$ etc. of outgoing code sequence $\alpha'$. Upon detecting a match between the reading of counter 180 and this preset value, comparator 190 de-energizes a normally energized output lead 192 terminating at AND gate 143 whereby the transmission of further clock pulses $CK_o$ to ring counter 141 is blocked. Pulse counter 180 is periodically reset, once per frame, by a pulse $r_{IV}$ emitted by programmer 101.

An *n*-stage operating memory 160 consists of flip-flops $160_1 - 160_n$ with setting inputs respectively connected to the set outputs of flip-flops $150_1 - 150_n$. A transfer pulse T from programmer 101, applied at the beginning of each frame to an enabling input of every flip-flop of memory 160, updates the contents of that memory in conformity with any changes that may have occurred in the setting of the corresponding stages of memory 150.

Figure 3:
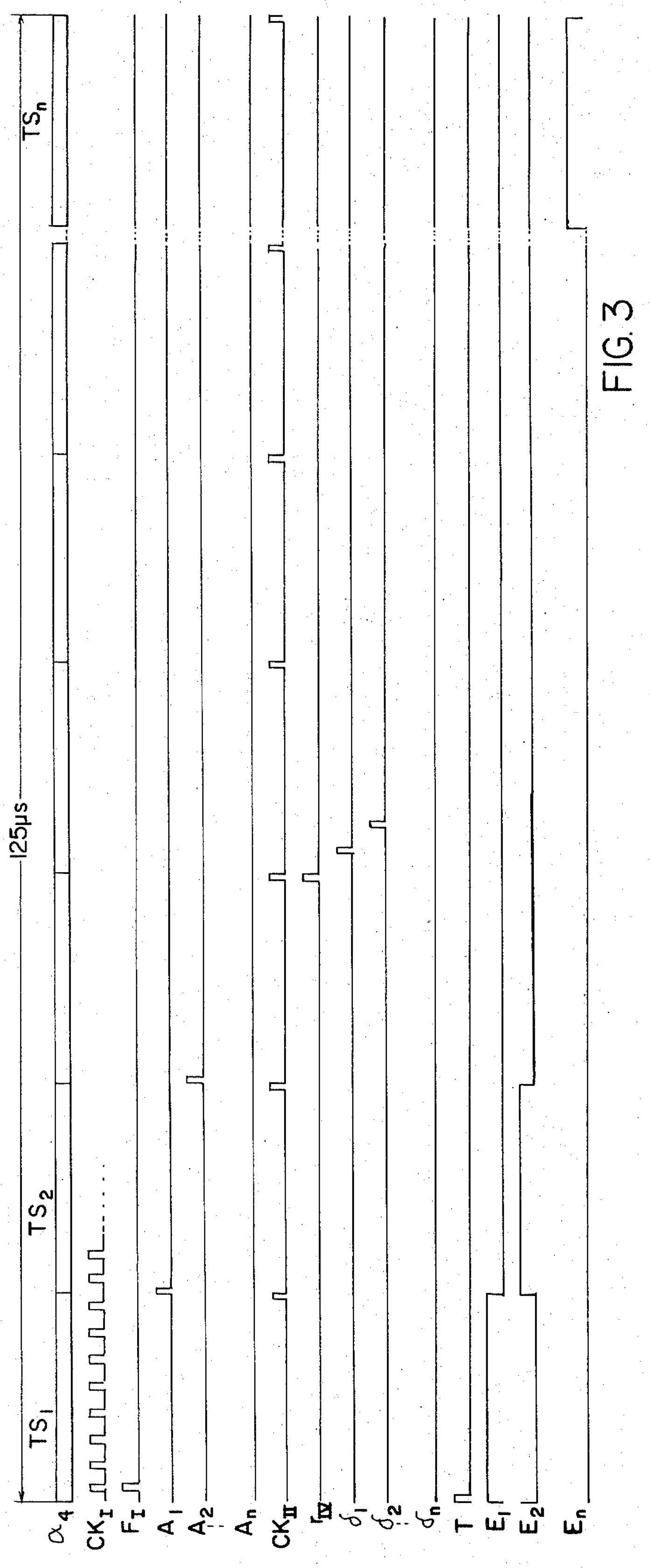

Processor 170 comprises a set of *n* AND gates $170_1 - 170_n$ respectively connected to the set outputs of flip-flops $160_1 - 160_n$; programmer 101 sequentially unblocks these AND gates by means of pulses $E_1 - E_n$ during each frame (cf. FIG. 3). The processor further includes two identical shift registers 172*a*, 172*b* which operate alternately, during odd-numbered and even-numbered frames as indicated in FIG. 2, to convert the incoming continuous code sequence $\alpha$ into the intermittent outgoing sequence $\alpha'$. This alternation is controlled by the programmer through a signal Q in the form of a square wave which is fed directly to an AND gate 173*a*, associated with register 172*a*, and to a pair of AND gates 174*b*, 175*b* associated with register 172*b;* its complement $\overline{Q}$ is applied through an inverter 179 to an AND gate 173*b*, associated with register 172*b*, and to two AND gates 174*a*, 175*a* associated with register 172*a*. The direct signal Q also reaches an inverting input of an AND gate 177*a* and a noninverting input of an AND gate 177*b* respectively connecting the outputs of registers 172*a* and 172*b* to OR gate 171; its complement $\overline{Q}$ from inverter 179 is applied to an inverting input of an AND gate 176*a* and to a noninverting input of an AND gate 176*b* through which the code sequence $\alpha$ is transmitted to registers 172*a* and 172*b*, respectively. Two OR gates 178*a* and 178*b*, serving to energize respective stepping inputs of registers 172*a* and 172*b*, receive the outputs of AND gates 173*a*, 174*a*, 175 *a* and 173*b*, 174*b*, 175*b*, respectively.

The two processor halves 172*a*–178*a* and 172*b*–178*b* being identical, only the first one will be described in detail.

Register 172*a* is of the type described in prior application Ser. No. 244,578, divided into two sections each having *n* sages for the storage of eight bits each. With input gate 176*a* unblocked in the presence of a pulse Q, the first section of his register is serially loaded during a writing phase with the bits of code sequence $\alpha$ at the relatively low cadence of clock pulses $CK_I$ delivered by the programmer 101 to the group coder 100 jointly with a recurrent starting pulse $F_I$ marking the beginning of each sampling interval (see also FIG. 3). These clock pulses $CK_I$ are applied to a third input of AND gate 173*a* so as to command the shifting of register 172*a* during the writing phase whenever gate 173*a* is unblocked by an output S of any one of the AND gates $170_1$–$170_n$ delivered to it via an OR gate $170_o$. This writing phase has been indicated in FIG. 2 at $S_a$ and $S_b$ for registers 172*a* and 172*b*, respectively.

Figure 4:
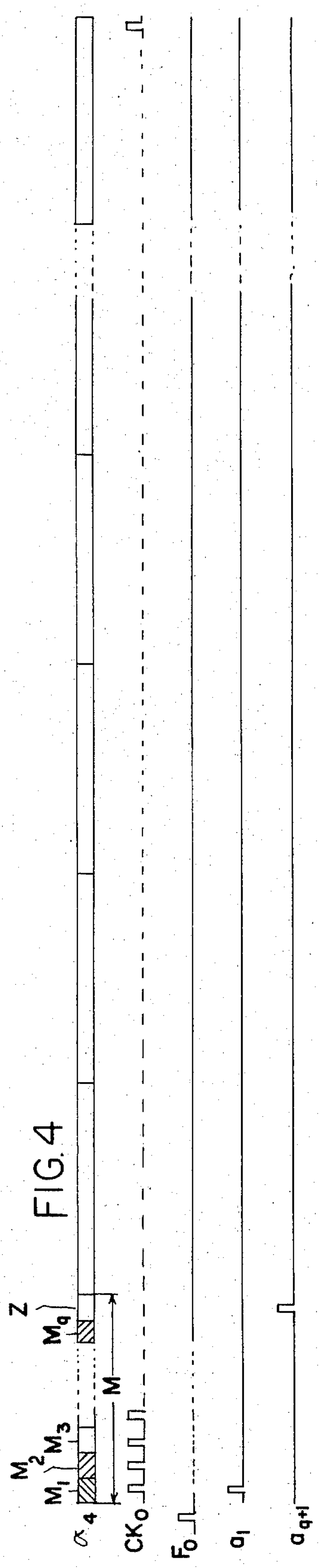

In the ensuing reading phase of register 172*a*, during which the companion register 172*b* is being loaded, the bits stored in the first section of register 172*a* are serially transferred at high rate to its second section in response to a train of shifting pulses X applied by programmer 101 to gate 174*a* during an initial period X*a* of that phase; FIG. 2 shows also the corresponding transfer period $X_b$ for register 172*b*. Thereafter, a train of reading pulses R applied by the programmer 101 to gate 175*a* discharges the contents of the second register section at relatively high speed (i.e. at the cadence of clock pulses $CK_o$ ) via AND gate 177*a* and OR gate 171 to multiplexer 106 as part of the intermittent code sequence $\alpha'$; the corresponding unloading periods have been indicated in FIG. 2 at $R_a$ for register 172*a* and R*b* for register 172*b*. The consolidated code groupings $\alpha'_1$, $\alpha'_2$ etc., which also include groups of allocation bits M as shown in FIGS. 2 and 4, are much shorter than the frames $\alpha_1$, $\alpha_2$. Multiplexer 106, accordingly, can intercalate a plurality of such groupings from different group coders in respective subframes of a single frame, possibly with the addition of supplemental or dummy bits to fill any unutilized time slots of a frame as described in the earlier Monti application. In this connection it should be noted that the various intervals $X_a$, $X_b$ and $R_1$, $R_b$, though shown as of identical length in FIG. 2, actually differ in duration according to the number of active lines and therefore to the number of message bits to the transferred and read out.

In FIG. 3 we have shown one of the frames of FIG. 2, specifically the frame $\alpha_4$, which encompasses the *n* sampling intervals $TS_1 - TS_n$ assigned to the several lines $L_1 - L_n$ of the channel group here considered; the lines of the other groups feeding the multiplexer 106 are sampled in the same rhythm. Each sampling interval contains eight clock pulses $CK_I$ and terminates with a test pulse $CK_{II}$ which just precedes the corresponding monitoring pulse $A_1$, $A_2$ etc. Reset pulse $r_{IV}$ for counter 180 occurs early in the frame and is followed by the scanning pulses $\delta_1$, $\delta_2$ etc. from ring counter 141 which have the cadence of the basic clock pulses $CK_o$. The frame begins with start pulse $F_l$ and ends with updating pulse T. Pulses $E_2$ – $E_n$ last each for the duration of a sampling interval. If the ring counter is not arrested because of excess channel activity, all $n$ scanning pulses are generated within a frame so as to set all the flip-flops of memory 160 associated with active channels.

FIG. 4 shows one of the outgoing code groupings of sequence $\alpha'$, specifically the grouping $\alpha'_4$, with its allocation part M consisting of bits $M_1$ – $M_q$ and synchronizing bit Z preceding the voice codes $Y_1$ – $Y_k$ of $k$ of $k$ channels found to be active. The corresponding subframe is introduced by a start pulse $F_o$ which is followed, at the cadence of clock pulses $CK_o$, by the gating pulses $a_1$ – $a_q$ that control the composition of the allocation message. Synchronizing bit Z has a true value only in every third frame, as counted from the beginning of a superframe marked by another start pulse not shown.

With linear counter 180 reset by pulse $r_{IV}$ during every frame whereas ring counter 141 is reset by pulse $r_{III}$ only once every $3m{\cdot}y$ frames, input memory 130 is scanned in random fashion and is not arrested until and unless the counter 180 detects an excessive number of active channels. Upon the occurrence of the next resetting pulse $r_{IV}$ in the frame immediately follwing, the scanner is promptly restarted.

Flip-flops 150 – 150$_n$ of memory 150 are reset early in the frame by a pulse $r_{II}$ which coincides with gating pulse $A_1$ and is shown derived from the same programmer output.

Figure 5:
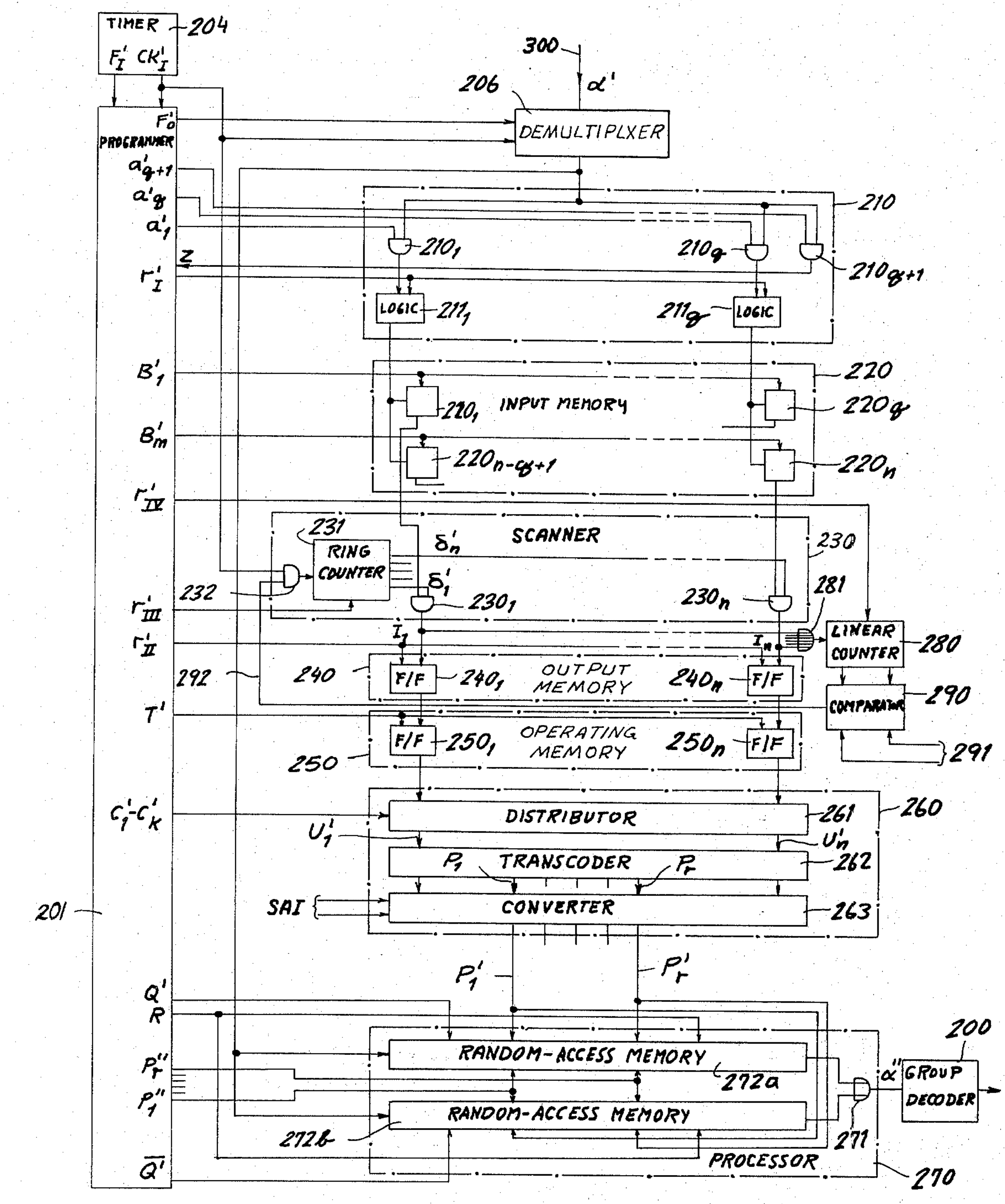

FIG. 5 shows the receiving side of a station included in the same system, i.e. another part of the station whose transmitting side is shown in FIG. 1 or a part of a corresponding station at a remote terminal.

Figure 6:
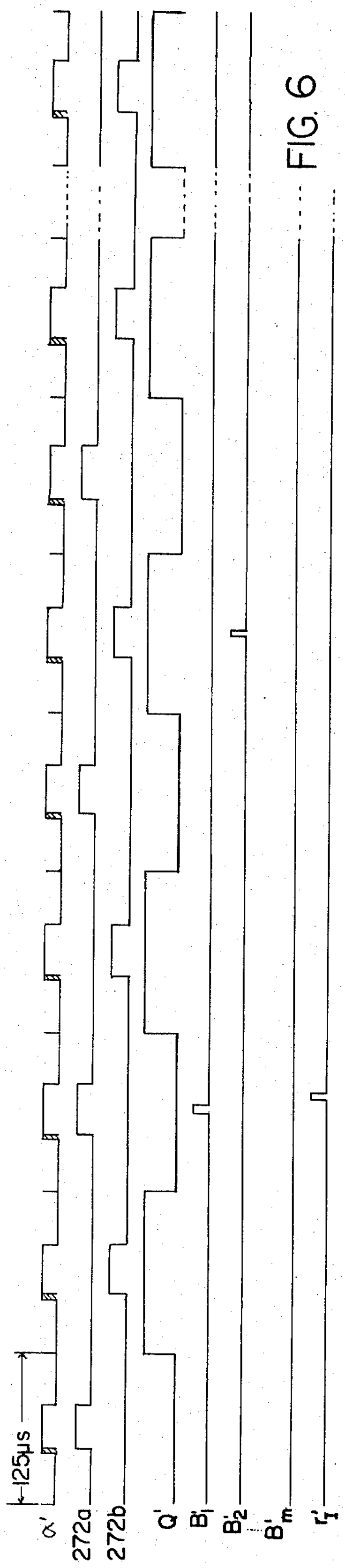
FIGS. 6, 7 and 8 are sets of graphs relating to the operation of the receiving circuits of FIG. 5.

An intermittent code sequence $\alpha'$ (FIG. 6), similar to that shown in FIG. 2, arrives via path 300 in interleaved relationship with other such sequences from which it is separated by a demultiplexer 206 The latter feeds this code sequence to a processor 270 and, in parallel therewith, to an allocation-message retriever 210 comprising a set of AND gates 210$_1$ – 210$_q$ as well as a further AND gate 210$_{q+1}$ for extracting the allocation bits and the synchronization bit of message portion M. The AND gates are periodically unblocked by respective pulses $a'_1$ – $a'_q$, $a'_{q+1}$ (see also FIG. 7) from a programmer 201, gates 210$_1$ – 210$_q$ working into respective logic circuits 211$_1$ – 211$_q$ which are designed as three-stage shift registers with majority-logic outputs so as to emit a pulse whenever at least two of their stages are loaded. In this way, transient changes in the allocation message do not affect the contents of an $n$-stage input memory 220 composed of an orthogonal array of stages 220$_1$ – 220$_n$ similar to the stages of the corresponding memory 130 in FIG. 1. Logic circuit 211$_1$ feeds the first stage 220 . 111 220$_{n-q+1}$ of each row of this memory whereas logic circuit 211 $_q$ supplies the last stage 220$_q$ . . . 220$_n$ thereof. The loading of these rows is controlled by respective enabling pulses $B'_1$ – $B'_m$ which are staggered three frames apart (see FIG. 6). Circuits 211$_1$ – 211$_q$ are reset by a pulse $r'_I$ from programmer 201 following each enabling pulse $B'_1$ – $B'_m$.

A cyclic scanner 230 comprises a set of $n$ AND gates 230$_1$ – 230$_n$ receiving the outputs of respective stages 220$_1$ – 220$_n$ of input memory 220 upon being sequentially unblocked by pulses $\delta'_1$ – $\delta'_n$ emitted by a ring counter 231 that is stepped through an AND gate 232 by clock pulses $CK'_o$ from a timer 204 (which could be identical with timer 104 of FIG. 1). AND gate 232 also has an input tied to an output lead 292 of a comparator 290 which is preset via input leads 291 to the same predetermined value as comparator 190 of FIG. 1. A linear pulse counter 280, stepped through an OR gate 281 by output pulses $I_1$ – $I_n$ of gates 230$_1$ – 230$_n$, loads the comparator 290 and is periodically resettable by a pulse $r'_{IV}$ (cf. FIG. 7) once per frame. Ring counter 231 is reset once in every $3m{\cdot}y$ frames by a pulse $r_{III}$ derived from synchronizing signal Z.

Figure 7:
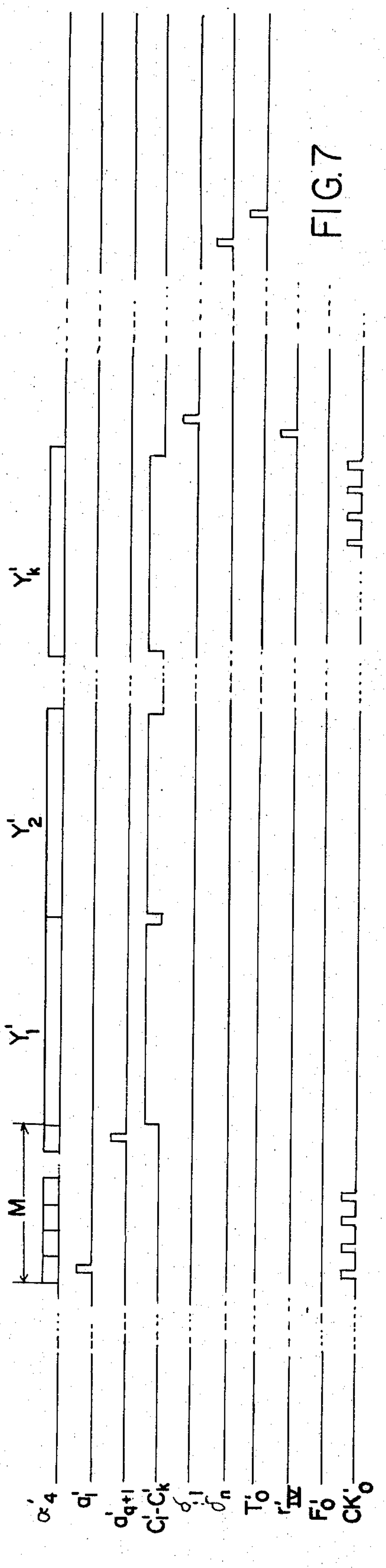
Figure 8:
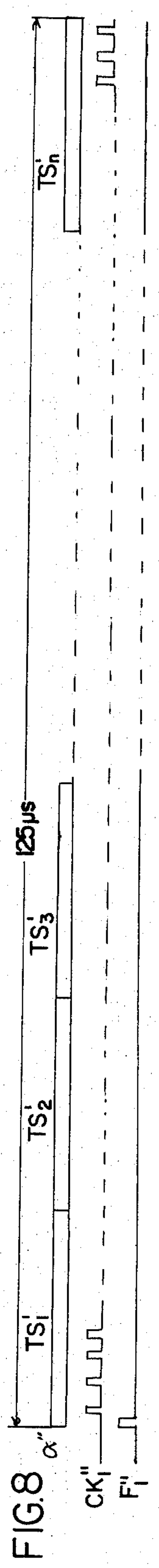

AND gates 230$_1$ – 230$_n$ feed the setting inputs of respective flip-flops 240$_1$ – 240$_n$ of an output memory 240 which is periodically reset by a pulse $r'_{II}$ at the beginning of each subframe. The bits stored in the stages of register 240 are transferred, in response to a periodic enabling pulse T' at the end of the subframe, to corresponding stages 250$_1$ – 250$_n$ of an operating memory 250. The latter, in turn, loads a distributor 261 in response to pulses $C'_1$ – $C'_k$, coinciding with respective code words $Y_1$ – $Y_k$ of the incoming code sequence $\alpha'$. According to the accompanying allocation message composed of bit combinations M, distributor 261 energizes certain of its output leads $U'_1$ – $U'_n$ which terminate at a transcoder 262 working into a conversion network 263; units 261 – 263 form part of an address decoder 260. Network 263 also receives extraneous digital information SAI stored in the terminal equipment of the receiving station. Transcoder 262 has a multibit output $P_1$ – $P_r$ identifying the active line represented by an energized output lead $U'_1$ $U'_n$ of distributor 261; conversion network 263 modifies the word $P_1$ – $P_r$ in accordance with the digital instruction SAI to provide the address (bits $P'_1$ – $P'_r$) to which a corresponding 8-bit code word of message $\alpha'$ is to be delivered in either of two identical random-access memories 272$a$, 272$b$ forming part of processor 270. These memories are alternately conditioned for writing by a signal Q' and its complement $\overline{Q'}$ emitted by the programmer 201. Writing at the rate of high-speed clock pulses $CK'_o$ from timer 204 thus alternates with reading, in response to a signal R from the programmer, at the rate of low-speed clock pulses $CK'_l$ emitted by the programmer; the cadence of pulses $CK_o$ at the transmitter and $CK'_o$ at the receiver is the same. The read-out is controlled by multibit words on programmer outputs $P''_1$ – $P''_r$ that determine the sequence in which the 8-bit code words stored in memories 272$a$, 272$b$ are to be transmitted through an OR gate 271, as part of a continuous sequence $\alpha''$, to their respective destinations via a group decoder 200 and other conventional routing equipment not shown; FIG. 8 illustrates the regrouping of these code words in periods $TS'_1$, $TS'_2$ . . . $TS'_n$ of the same length as the original sampling intervals $TS_1$ – $TS_n$ of FIG. 3. FIGS. 7 and 8 also show start pulses $F'_o$ and $F'_l$ entering and leaving the programmer 201, which are the counterparts of pulses $F_o$ and $F_l$ shown in FIGS. 4 and 3, respectively.

The disclosed system may be expanded, if desired, to encompass a plurality of stations at each terminal, in the general manner described in the above-identified Monti application.

We claim:

1. A PCM voice-frequency telecommunication system with a first station and a second station linked with each other by a signal path for the transmission, in a recurrent message frame, of digitized message samples in the form of multibit pulse codes between groups of local voice channels served by said first station and groups of local voice channels served by said second station, comprising:

synchronized timing means at said first and second stations establishing recurrent frames and subframes;

a group coder for each group of a voice channels at said first station generating during each frame a continuous code sequence extending over $n$ sampling intervals and containing blank codes relating to inactive channels along with code words representing the digitized message samples of all active channels of its group in a predetermined order;

monitoring means at said first station for determining the activity of all in channels of a group;

first processing means at said first station responsive to an activity pattern from said monitoring means for eliminating all blank codes from said continuous code sequence issuing from the corresponding group coder and consolidating the remaining code words thereof into code groupings forming part of an intermittent code sequence, each code grouping containing a maximum number of bits equaling the number of time slots allotted to the channel group in an assigned subframe within each message frame;

multiplexing means at said first station connected to said processing means for delivering said intermittent code sequence to said signal path in its assigned subframe and in interleaved relationship with similar code sequences from other channel groups;

first storage means individual to a channel group at said first station including a first $n$-stage input memory connected to said monitoring means for registering said activity pattern and a first $n$-stage output memory connected to said first processing means for controlling the elimination of said blank codes, said activity pattern including a characteristic bit for each active channel;

first cyclic scanning means at said first station connected to be periodically stepped by said timing means for controlling the stage-by-stage transfer, during each frame, of said activity pattern from said first input memory to said first output memory with generation of a first output pulse upon the transfer of each characteristic bit;

first counting means at said first station connected to receive said first output pulses from said first scanning means and to arrest same upon reaching, in any frame, a predetermined maximum pulse count determined by the number of time slots allotted to the corresponding channel group, said first counting means being resettable by said timing means for restarting the pulse count in each frame with resumption of transfer of the activity pattern from said first input memory to said first output memory at a randomly selected stage of said first input and output memories;

demultiplexing means at said second station connected to said signal path for recovering said intermittant code sequence from arriving message signals;

second processing means at said second station connected to said demultiplexing means for receiving said intermittent code sequence therefrom and reconverting same into a continuous code sequence with interspersed blank codes relating to inactive channels;

insertion means in said first processing means connected to said monitoring means for introducing an aliquot $q$-bit fraction of an $n$-bit allocation message, corresponding to said activity pattern, into each of said code groupings with transmission of a complete allocation message in the course of a predetermined frame series;

retrieval means at said second station connected to extract said $q$-bit fraction from said demultiplexing means for reconstituting said allocation message therefrom;

second storage means individual to a channel group at said second station including a second $n$-stage input memory connected to said retrieval means for registering a replica of said activity pattern and a second $n$-stage output memory connected to said second processing means for determining the time position of the individual code words of said intermittent code sequence in the continuous code sequence issuing from said second processing means;

second cyclic scanning means at said second station connected to be periodically stepped by said timing means for controlling the stage-by-stage transfer, during each frame, of said replica from said second input memory to said second output memory with generation of a second output pulse upon the transfer of each characteristic bit;

second counting means at said second station connected to receive said second output pulses from said second scanning means and to arrest same upon reaching, in any frame, said predetermined maximum pulse count, said second counting means being resettable by said timing means for restarting the pulse count in each frame with resumption of transfer of said replica from said second input memory to said second output memory at a stage of said second input and output memories corresponding to said randomly selected stage; and decoding means for said code words connected to said processing means.

2. A system as defined in claim 1 wherein said first and second scanning means are provided with synchronized resetting means controlled by said timing means for restoration to a starting position after a period equaling a whole number of times said predetermined frame series.

3. A system as defined in claim 1 wherein said monitoring means is controlled by said timing means to update the contents of said first input memory during a succession of $p$ consecutive frames, $p$ being an integer greater than 1, said predetermined frame series encompassing $np/q$ frames, said retrieval means including logical circuity for evaluating said $q$-bit fraction during corresponding successions of $p$ consecutive frames.

4. A system as defined in claim 3, further comprising synchronization means at said first station controlled by said timing means for insertion of a synchronizing bit into each of said code grouping once every $p$ frames, said retrieval means including detector means for said synchronizing bit.

5. A system as defined in claim 3 wherein said first and second counting means each comprises a ring counter, a source of stepping pulses for said ring counter in said timing means, and blocking means for said stepping pulses controlled by said first and second counting means, respectively.

6. A system as defined in claim 5 wherein said first and second counting means each comprises a linear pulse counter, digital signaling means set to convey a set of reference bits representing said maximum pulse count, and comparison means connected to said linear pulse counter and to said signaling means.

7. A system as defined in claim 1 wherein said first processing means comprises a pair of shift registers alternately controlled by said timing means for loading and unloading in respective frames.

8. A system as defined in claim 1 wherein said second processing means comprises a pair of random-access memories alternately controlled by said timing means for loading and unloading in respective frames.

9. A system as defined in claim 1 wherein the stages of said first input memory are divided into m sets of $q$ stages each, with $m \cdot q = n$, said insertion means being successively connectable to the stage outputs of each of said $m$ sets for deriving said $q$-bit fraction therefrom.

10. A system as defined in claim 1 wherein each of said storage means comprises an $n$-stage operating memory inserted between the associated output memory and processing means, said operating memory being provided with enabling inputs connected to said timing means for updating the contents of its $n$ stages once per frame from the contents of corresponding stages of the associated output memory.

* * * * *